July 8, 1958   D. W. SPARKS   2,842,740
ELECTRONIC VOLTMETERS
Filed Nov. 4, 1953   2 Sheets-Sheet 1

INVENTOR.
DAVID W. SPARKS
BY
ATTYS.

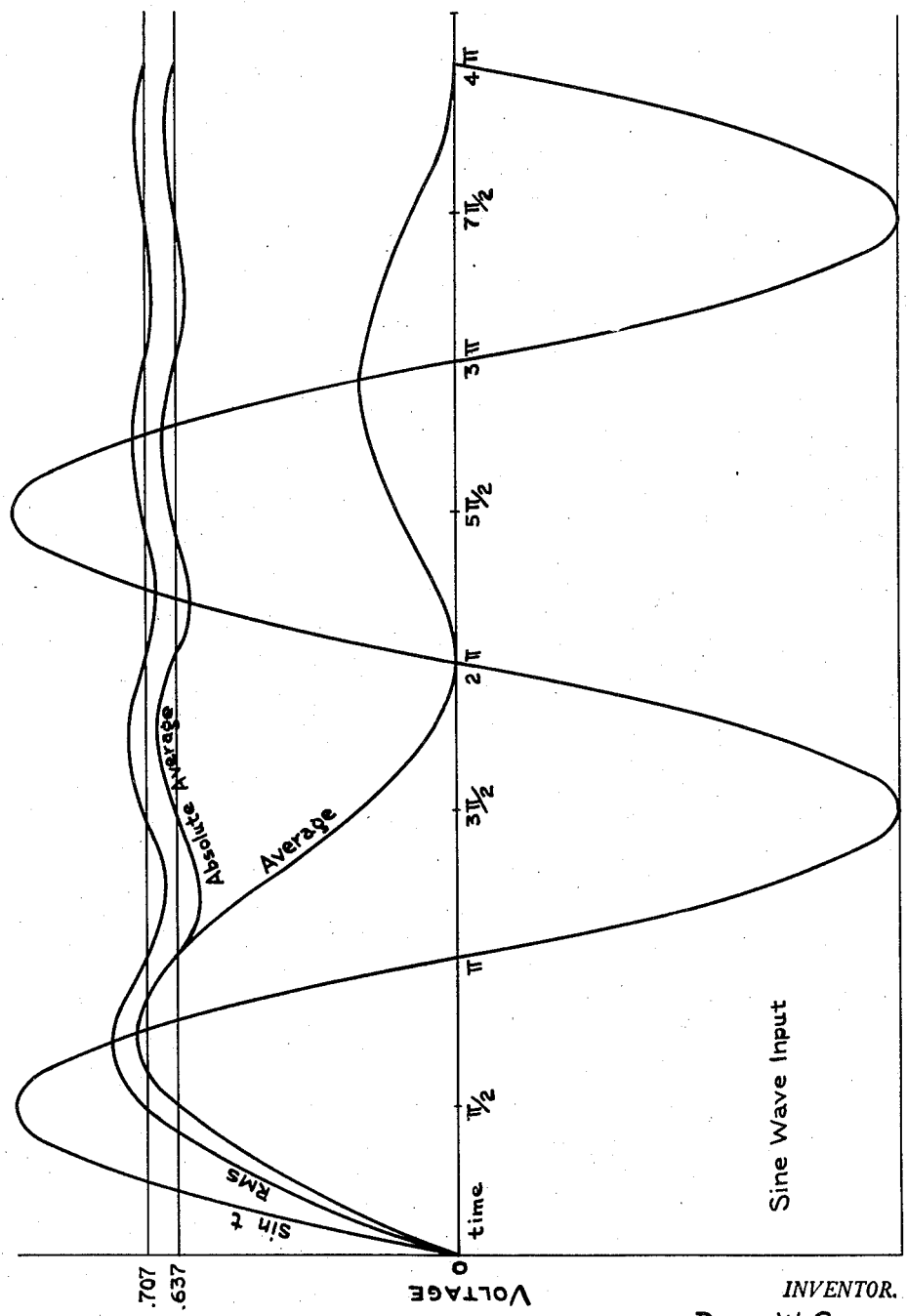

United States Patent Office 2,842,740
Patented July 8, 1958

2,842,740
ELECTRONIC VOLTMETERS

David W. Sparks, Westfield, Ind., assignor to the United States of America as represented by the Secretary of the Navy Application November 4, 1953, Serial No. 390,259

11 Claims. (Cl. 324—120)

(Granted under Title 35, U. S. Code (1952), sec. 266)

The invention described herein may be manufactured and used by or for the Government of the United States of America for governmental purposes without the payment of any royalties thereon or therefor.

The present invention relates to a voltmeter for measuring the "true" root-mean-square value of the voltage of a complex waveform. The voltmeter of this invention will also read the average voltage and the absolute average voltage.

Existing root-mean-square meters make use of a system which performs the necessary integration and division by time by means of exponentially weighted averages. Such divisions have a time constant which is long compared to the period of the lowest frequency components in the input waveform. These meters will produce a usable reading only after the lapse of a considerable portion of the meter time constant. This defect applies to meters such as electrostatic voltmeters and thermocouple type meters.

One object of this invention is to provide a meter for reading the root-mean-square value of a voltage with a complex waveform.

A second object is to provide an instrument which will give a reading of the root-mean-square value applied which approaches the true value to any desired degree of accuracy in a time less than the period of the lowest frequency component of the voltage waveform.

Another object of the present invention is to provide an instrument which can selectively indicate the root-mean-square value, the average value or the absolute average value, of a voltage.

Another object of this invention is to provide a simple means for dividing by function of time.

Figure 1:
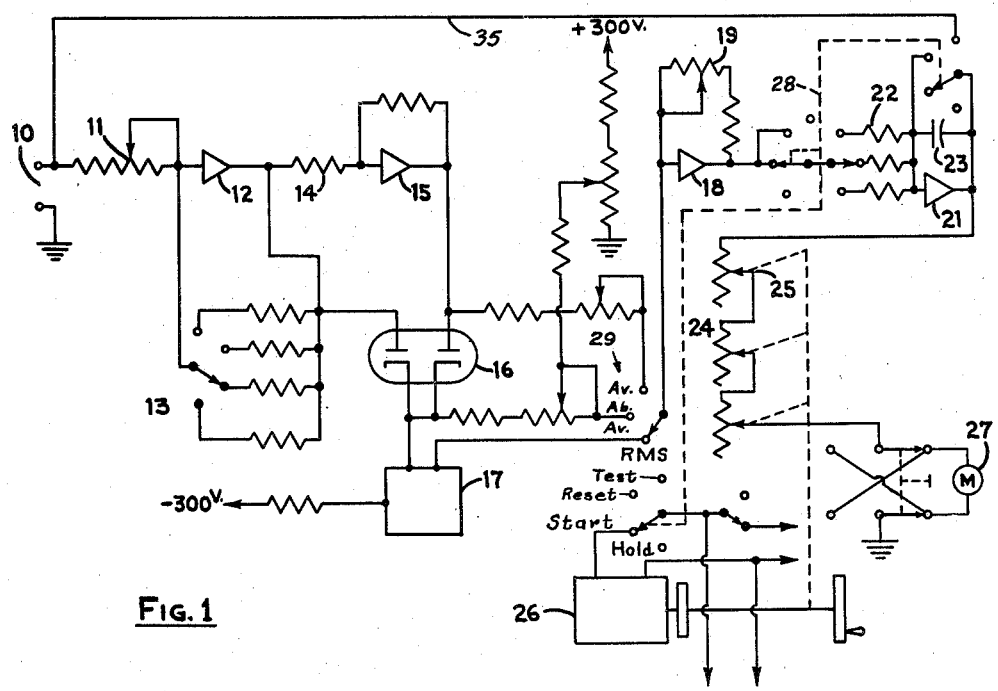
Figure 2:
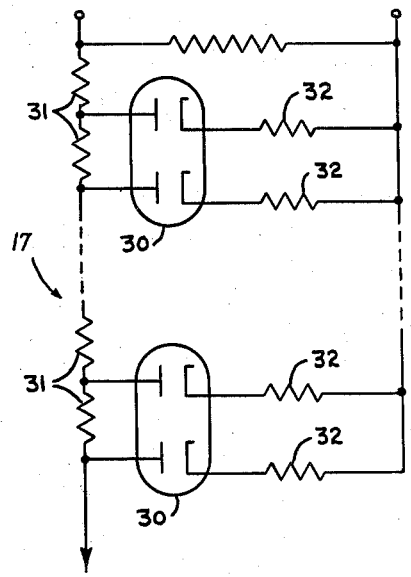

Other objects and features of the invention will become apparent to those skilled in the art as the disclosure is made in the following detailed description of a preferred embodiment of the invention as illustrated in the accompanying sheets of drawings in which:

Figure 1 is a general schematic diagram of an embodiment of the present invention, Figure 2 is a schematic diagram of the conventional squaring circuit used in the present invention, and Figure 3 is a graph of the input and outputs of the meter for a pure sine wave input plotted together for ease of comparison.

The invention, which is the subject of this application, is designed to completely mechanize the mathematical definition of a "true" root-means-square value, and to respond over a frequency range from direct current to 10,000 cycles per second or higher, where the subaudio-frequency components may be an important fraction of the total voltage waveform. This mathematical definition is $$E_{RMS} = \left[ \frac{1}{t} \int_0^t E_i^2 dt \right]^{1/2} \quad (1)$$

where $E_{RMS}$ is the root-mean-square of the input voltage, $E_i$ is the input voltage, $t$ is time, and $dt$ is the derivative of time. The other quantities measured by this voltmeter may also be defined mathematically as follows:

$$E_{av.} = \frac{1}{t} \int_0^t E_i dt \quad (2)$$

where $E_{av.}$ is the average of the input voltage $E_i$, and $$E_{abs. av.} = \frac{1}{t} \int_0^t |E_i| dt \quad (3)$$

where $E_{abs. av.}$ is the absolute average of the input voltage.

In general this voltmeter presents a very high impedance to the circuit being tested so that substantially no load is placed on the tested circuit by this voltmeter. The voltage waveform is amplified and divided into two components which are inverted with respect to each other. These components are fed to a full wave rectifier to give the absolute value of the voltage wave. When the voltmeter is used to read the root-mean-square value of the voltage this rectified current is fed into a square law device whose output is amplified and integrated. The output of the integrating circuit is divided by a function of time and the result displayed on an indicating meter on which a scale is calibrated to read the square root of its current.

If it is desired to read the average value of the input voltage, the input of the integrating circuit may be connected directly to the output of the input circuit, and a suitable scale for the indicating meter would be chosen. To read the absolute average with this meter it is only necessary to change the input to the integrating circuit from the squaring circuit to connect directly to the output of the rectifying circuit and then again select a suitable scale for the indicating meter.

A preferred embodiment of the invention will now be described with reference to the accompanying drawings in which like reference characters designate like or corresponding parts throughout several views.

The circuit provides a pair of test or input terminals 10 which feed through an input resistor 11 to a D. C. amplifier 12 of a high gain type, which has a feed back circuit 13. The feed-back circuit 13 includes switchable resistors of different values for adjusting the impedance in this circuit. In such an amplifier the output voltage is related to the input voltage by the equation $$E_{out} = -AE_{in} \quad (4)$$

where the E's are voltages and A is the amplification factor of the amplifier. Such amplifiers have the characteristic that their output is degeneratively fed back to the input of the amplifier and causes the circuit to present substantially an impedance equal to the input resistor 11 to the input signal; also the input voltage to the amplifier is maintained at substantially zero potential.

This can be seen from a consideration of Equation 4 when solved for $E_{in}$ gives $$E_{in} = \frac{-E_{out}}{A}$$

therefore, since A is very large as compared to $E_{out}$, $E_{in}$ must be very small. This is sufficiently small to be neglected in what follows, so we may state that at all times, the amplifier input is practically at ground potential. Thus the current flowing into the input through the input resistor is merely the external potential to which it is connected divided by the resistance of the input resistor. If this current did not all flow through the feedback element, the potential at the input would increase in such a direction as to cause the output of the amplifier to change so as to increase the current flow through the feedback element. This will continue until all current flowing into the input through the input resistor flows out through the feedback element. Recalling again that the input always remains practically at ground potential, then the output potential must be that which is developed across the feedback element by this current flowing through it.

This arrangement is the input circuit of the voltmeter enables the voltmeter to operate without appreciably loading the circuit being tested and makes the instrument essentially insensitive to amplifier gain changes. The amplifiers 12, 15, 18 and 21 are all of the same type with their feedback circuits chosen to match their particular input circuits. By selecting the proper resistance values for the feedback circuit of the amplifier 12, the scale factor of the output of the voltmeter of this invention may be controlled. The output of the amplifier 12 feeds through a resistor 14 into a second D. C. amplifier 15, also of the feedback type, which produces at its output a voltage equal and opposite in polarity to the output of amplifier 12. The output of amplifier 12 is also fed directly to one of the plate electrodes of a full-wave rectifier. The output of the inverter amplifier 15 is fed to the other plate electrode of the rectifier 16.

For a root-mean-square reading of this meter the output of the rectifier 16 is fed to a squaring circuit 17 which is of the type shown in Figure 2, to be described later. For this particular application it is desirable to control the current value from the squaring circuit. This is accomplished by feeding the output current of the squaring circuit 17 into the circuit of the amplifier 18. This results in the amplifier 18 producing in its feedback circuit a current equal and opposite to that fed into it so that the voltage appearing at the output is the voltage dropped across its feedback resistor 19, and is proportional to the squaring circuit current. This voltage is fed into a D. C. amplifier 21 through an input resistor 22 which resistor may be variable for different expected time intervals. The D. C. amplifier 21 has in its feedback circuit a condenser 23, which constitutes an integrating means, and the feedback action of this amplifier 21 constrains the current to flow into its feedback element, the condenser 23. The D. C. amplifier and its feedback circuit may be of the Miller integrator or similar type in which the amplifier is of high gain and the condenser is of high quality and protected against leakage conductance for the purpose of performing over long time periods, as will later appear in the description of operation. The amplifier circuit may include a cathode follower, as is well understood in the art, to improve the integration characteristics as well as to avoid the impedance load of the time division circuit 24, 25, soon to be more fully described. It will be recalled that voltage E developed across the condenser is related to the current $i$ flowing into it by the equation $$E = \frac{1}{C}\int_0^t i\, dt \qquad (5)$$

where C is the capacity of the condenser and $t$ is the derivative of time. It follows from this relation and the fact that the input to the amplifier 21 is very nearly zero potential at all times that the output voltage $E_0$ of the amplifier 21 must follow the relationship $$E_0 = K\int_0^t E_i^2\, dt \qquad (6)$$

where $E_i$ is the input voltage, K is a constant, and $dt$ is the derivative with respect to time. This is true since the current in the feedback circuit of the integrator was made proportional to the square of the input voltage which appears at the output of amplifier 18, or we may say that $i$ is equal to $K_1 E_i^2$, where $K_1$ is a constant of proportionality. In Equation 6 K includes 1/C and $K_1$, therefore, by substituting in Equation 5 we get the output voltage $E_0$ given by Equation 6. This output is proportional to the integral of the input or test voltage. The output of the amplifier 21 is then passed through a resistance 24 which has a movable contact 25. The contact 25 is driven by a motor 26 so that it drives the full length of the resistance element during the time constant selected for the voltmeter. While the resistance 24 and movable tap 25 would not be necessary for a voltage input of pure sine wave form, these elements are necessary in the combination for getting the average, absolute, or RMS values of complex wave forms. Although any desirable time constant can be chosen, it has been found advisable to cycle the elements 24, 25, or rotatable potentiometer, sufficiently long to consider a number of the waves in the input. A time constant eight to ten minutes has been found to be satisfactory. The output from this contact 25 is applied to a meter of the D'Arsenval type whose needle deflection is proportional to the current flowing through it and whose scale is calibrated as the square root of the current passing through it. In practice it is desirable that the resistance be linear and that the motor be of a constant-speed type. A four-position switch 28 having three gangs is illustrated to switch the circuit for taking readings from the meter 27 while a three-pole switch 29 is used to switch the circuit for readings of the root-mean-square values, average values, and absolute average values.

The squaring circuit referred to above may, for example, consist of a cascade of diodes 30 separated by resistances 31 and having a resistance 32 in series with the output of each diode. The values of the resistances are adjusted so that the diodes fire successively and such that the total current through the diodes, when plotted against the input voltage approximates the curve $i = CE^2$ where $i$ is the total output current, E is the input voltage, and C is a constant proportionality.

For operation as a meter to read the absolute average the circuit is substantially the same as that described for obtaining the root-mean-square. The only changes required are the switching of the input to amplifier 18 from the output of the squaring circuit 17 to the output of the rectifier 16 through a suitable input resistor by switch 29.

For operation to read the average voltage the input to the amplifier 18 is further shifted by switch 29 to connect the amplifier 18 to one of the component circuits applied to the plates of the rectifier 16. This could be a connection either to the output of amplifier 12 or 15, depending on the desired polarity.

In operation, a signal applied to input terminals 10 containing voltage waveforms of a complex nature is fed through the input resistor 11 to D. C. amplifier 12 whose response is characterized by Equation 4 as stated above. Since the input element of the amplifier is connected internally only to the control grid of a vacuum tube, essentially no current can flow in it. Thus, current flowing into the input resistor must at all times flow out through the feedback resistor. So long as the amplification factor A in Equation 4 is much greater than one, the feedback action will constrain the potential at the input element of the amplifier to be essentially zero. To see that this is so, assume that the potential at the input element is slightly positive. By Equation 4 this will drive the output more negative, which tends to decrease the potential at the input. This will continue until the input potential is essentially zero, its difference from zero being just that required by Equation 4 to maintain the output at its final potential. Since the same current flows in both the input resistor 11 and the feedback resistor 13, and from the above, their common ends are practically at ground potential, it follows that the potential at the amplifier output is equal to the potential at the input 10 multiplied by the ratio of these resistances 11 and 13. This voltage is applied to the inverting amplifier 15 whose output is the inversion of the output of amplifier 12 and has the same amplitude. The equal and opposed output of the input and inverter amplifiers are fed to the plates of the full wave rectifier 16 which drives the squaring circuit 17. The squaring circuit operates when the voltage from the rectifier is impressed across the cascaded elements composed of diodes and resistors which have been adjusted so that their current flow curve approximates the curve of the square of the voltage applied across them. With the switch 29 in the "RMS" position, the output current of the squaring circuit is fed to the amplifier 18 which converts the current of the output into a voltage drop across its feedback resistor 19. Measurement should begin by placing the switch 28 in the "Reset" position to completely discharge the condenser 23, and the handwheel of the motor 26 should be rotated to set the resistance contact 25 at the zero position. Placing the switch 28 in the "Start" position connects the amplifier 18 output to the amplifier 21 and starts the motor 26. This output voltage of amplifier 18 feeds the amplifier 21 through resistance 22. As was explained above, the feedback element consists of a condenser 23 which makes the amplifier 21 an integrating device which integrates this current from amplifier 18 which we have found was proportional to the square of the input voltage. The output of the amplifier 21 is applied to the condenser 23 which will build up and store the integrated voltage value. This value is divided by time in the resistance 24 by the movement of the movable contact 25 which moves in response to the constant speed motor 26. The output reading is taken when the indication on the meter 27 ceases to fluctuate more than the error tolerated for the measurement. The time interval can be stopped at any time by operating the switch 28 to the "Hold" position which breaks the circuit between the amplifiers 18 and 21 and also breaks the circuit of motor 26. The integrated charge on the condenser 23 will hold long enough to obtain a final meter reading of the root-mean-square value of the input voltage wave at terminals 10. This operation can be seen mathematically from a consideration of the following relations. That since motor 26 is a constant speed motor the resistance at any given time of resistance 24 is a function of time or $R = Kt$ (7), where $K$ is an arbitrary constant and $t$ is time. The current $i$ passing through $R$ is equal to $E/R$.

$$i = E/R \qquad (8)$$

Substituting the value $R$ obtained above, $i$ then becomes equal to $E/Kt$ and the current flowing through the meter 27 is proportional to $E/t$ where $E$ is proportional to $$\int_0^t E_i^2 dt$$

Therefore, if the scale of the meter is calibrated to indicate a quantity proportional to the square root of the current passing through it, its reading would be the quantity defined by equation $$E_{\text{RMS}} = \left[ \frac{1}{t} \int_0^t E_i^2 dt \right]^{1/2}$$

The RMS value would be of very high accuracy since the motor driven potentiometer 24, 25 would be in operation long enough to consider a great number of wave forms in the input voltage, the greater the complexity of waves the longer the time constant for considering the complex waves. It is not necessary that the motor 26 be driven in synchronism to the input voltage, it only being necessary that the motor 26 be of constant speed, as hereinbefore described, so that an accurate time interval can be determined.

For the voltmeter to read the absolute average value of the input voltage, the input of amplifier 18 is shifted from the squaring circuit directly to the output of the rectifier 16 by switch 29 and the scale of the indicating meter 27 is chosen as a linear scale rather than a square root scale. By this switching connection the positive and negative rectified half cycles of the input voltage waves are considered which will provide the indication of the absolute average value as distinguished from the average value derived from considering only the half cycles of the input waves described below. Here the E in Equation 8 is now proportional to $$\int_0^t |E_i| dt$$

The other elements of the circuit are operated and function just as in the previously described operation for the root-mean-square reading.

The device will function to read the average value of the input voltage if the input to the amplifier 18 is shifted to be connected by switch 29 directly to the output of the inverter amplifier. While the absolute average value switched position gives readings for complete wave forms of the input voltage, the average value switched position presents readings of either the positive or the negative half cycles of the input voltage, as will appear clear in the subsequent reference to Fig. 3. In this case, too, all the elements of the circuit are operated and function as described for the root-mean-square reading except that the rectifier and the squaring circuit are cut out. In this case the E in Equation 8 is proportional to $$\int_0^t E_i dt$$

To illustrate that the equations mechanized give the required values and to show that readings of the desired accuracy may be obtained by selecting the time of operation of the circuit, a graph of a sine wave input with the possible readings obtainable has been made and is shown in Figure 3. The sine wave and each of the other functions have been plotted with a common zero and to the same scale to facilitate comparison. The sine wave in Figure 3 is identified by sin $t$ which is the input voltage wave applied to the terminals 10 of Figure 1 for the purpose of example herein. The sine function was chosen because its equation was known and it was relatively simple to evaluate, however, it is to be understood that the voltmeter would be responsive to any complex waveform. The time interval, in which the switch 28 was in the "Start" position, was short in this example, going only to $4\pi$, or for two full cycles of the sine wave. During this time interval the meter reading will rise and level off in a damped oscillation, as shown by the curve identified as "RMS," when the switch 29 is in the "RMS" position. For an absolute average reading in which the switch 29 is positioned in the "Ab. Av." position, the needle will rise and level off in damped oscillations below the level of the meter reading for the RMS values, as shown by the curve identified by "Absolute Average." Likewise, for an average value reading, in which the switch 29 is in the "Av." position, the meter indication would have oscillations to dampen out to zero, as shown by the curve identified by "Average," as should be expected for a pure voltage sine wave input to the circuit of Figure 1. In all of the above examples it is to be understood that the operating procedure must be followed for each meter reading, as explained above in the control of switch 28, so that the condenser 23 will be discharged before each measurement is taken. It can readily be seen that the RMS value of a sine wave approaches calculated value of .707 and that the absolute average approaches .637 while the average approaches zero on the basis of the circuit being adjusted to have its maximum value at the highest peak or amplitude of the voltage wave, as illustrated in Figure 3 by sin $t$. While these measurements result from a voltage sine wave tested, complex waves would present different values indicated by the meter 27. For a complex voltage wave tested, the average value would not necessarily be zero, but would be indicated at a value, positive or negative, in accordance with the average value of the complex wave. A reversing switch is in the circuit to the meter 27 to get proper indications of either positive or negative values. Also from the graph it can be seen that the meter would read approximately the correct value after only a portion of a cycle.

A conductor 35, from the input 10 to a terminal in one gang of the switch 28 to enable a coupling of the amplifier 21 output to the input 10, may be used as a test circuit to determine, prior to measurement tests, whether the integrator circuit is functioning properly.

It should be understood, of course, that the foregoing disclosure relates to a preferred embodiment of the invention and that numerous modifications or alterations may be made therein without departing from the spirit and the scope of the invention.

What is claimed is:

1. A voltmeter comprising an input circuit, means coupled to said input circuit for obtaining a positive and a negative component of a voltage applied to said input, said components having the same amplitude, rectifier means coupled to said first-mentioned means for rectifying said components, voltage squaring means fed by said rectifier means, integrating means fed from said voltage squaring means, means coupled to said integrating means for varying the output voltage of said integrating means at a constant rate with time, means connected to said last-mentioned means and indicating the square root of the resulting output to give the root-mean-square value of said input voltage.

2. A voltmeter having an input, indicating means for indicating the output of said voltmeter, integrating means for integrating a current which is proportional to a voltage, means connected between said indicating means and said integrating means for dividing the output of said integrating means by a function of time for said indicating means, a rectifier connected to said input, a voltage squaring network connected to said rectifier, and switching means connected to said integrating means selectively connecting said integrating means to said squaring network, to said rectifier output, and to said input.

3. A voltmeter comprising an input circuit means for producing equal and sequentially oppositely phased components of an input voltage, rectifier means coupled to said input circuit means for rectifying said components, a voltage squaring network fed from said rectifier means, integrating means coupled to said voltage squaring network for integrating the output of said voltage squaring network, dividing means coupled to said integrating network for dividing the output of said integrating network by time, and indicating means coupled to said dividing means for indicating the square root of the output of the dividing means.

4. A voltmeter as claimed in claim 3 in which said dividing means for dividing by time comprises a linear resistance having a movable contact, means for moving said contact at a constant rate, said contact providing the connection to said indicating means.

5. A voltmeter having a high impedance input, means connected to said input supplying two components of the output of the high impedance input, one of said components being out of phase with the other, rectifier means coupled to the output of said first-mentioned means for rectifying said components, voltage squaring means coupled to said rectifier means for squaring the output of said rectifier means, integrator means, means coupled to said integrator means selectively connectable directly to one of said components, the output of said rectifier, and the squaring means for selectively integrating said outputs, dividing means coupled to said integrator means for dividing the output of said integrating means by a function of time, and means indicating the output of said dividing means.

6. A voltmeter as claimed in claim 5 in which said high impedance comprises a high gain feedback amplifier.

7. A voltmeter as claimed in claim 6 in which said means supply two components of the input comprise the outputs of said high impedance input feedback amplifier and of an inverter feedback amplifier.

8. A voltmeter as claimed in claim 5 in which said voltage squaring means comprises a cascade arrangement of diodes and resistors.

9. A voltmeter as claimed in claim 8 in which said integrator means comprises a condenser connected in the feedback circuit of a high impedance high gain amplifier.

10. A voltmeter as shown in claim 9 in which said dividing means comprises a resistor having a movable contact, a motor connected to displace said contact at a constant rate proportional to the function of time.

11. A voltmeter as claimed in claim 10 in which said indicating means is calibrated to indicate the square root of the output of said dividing means.

No references cited.

UNITED STATES PATENT OFFICE

CERTIFICATE OF CORRECTION

Patent No. 2,842,740                                            July 8, 1958

David W. Sparks

It is hereby certified that error appears in the printed specification of the above numbered patent requiring correction and that the said Letters Patent should read as corrected below.

Column 1, line 63, for "root-means-square" read -- root-mean-square --; column 3, line 6, for "arrangement is" read -- arrangement in --; column 8, line 28, for "supply" read -- supplying --.

Signed and sealed this 23rd day of September 1958.

(SEAL)
Attest:

KARL H. AXLINE                                           ROBERT C. WATSON

Attesting Officer                                        Commissioner of Patents